US011925943B2

(12) United States Patent
Martinson

(10) Patent No.: US 11,925,943 B2
(45) Date of Patent: Mar. 12, 2024

(54) HYDRAULIC SHELL-SEED SEPARATOR

(71) Applicant: Crown Iron Works Company, Blaine, MN (US)

(72) Inventor: Wade Steven Martinson, Minneapolis, MN (US)

(73) Assignee: CROWN IRON WORKS COMPANY, Blaine, MN (US)

(*) Notice: Subject to any disclaimer, the term of this patent is extended or adjusted under 35 U.S.C. 154(b) by 0 days.

(21) Appl. No.: 17/914,081

(22) PCT Filed: Mar. 24, 2021

(86) PCT No.: PCT/US2021/023967
§ 371 (c)(1),
(2) Date: Sep. 23, 2022

(87) PCT Pub. No.: WO2021/195270
PCT Pub. Date: Sep. 30, 2021

(65) Prior Publication Data
US 2023/0149943 A1    May 18, 2023

Related U.S. Application Data

(60) Provisional application No. 62/994,520, filed on Mar. 25, 2020.

(51) Int. Cl.
*B03B 5/62* (2006.01)
*B03B 11/00* (2006.01)

(52) U.S. Cl.
CPC .............. *B03B 5/623* (2013.01); *B03B 11/00* (2013.01)

(58) Field of Classification Search
CPC .......... B03B 5/623; B03B 11/00; B03B 5/28; B03B 5/30; B03B 5/46; B03B 5/62; B03B 5/64; A23N 5/00
(Continued)

(56) References Cited

U.S. PATENT DOCUMENTS 2,464,005 A * 3/1949 Teague ................ A23N 5/08
209/4
2,513,836 A 7/1950 Auer
(Continued)

FOREIGN PATENT DOCUMENTS

CN    108575184 A    9/2018
GB    1381704 A    1/1975
(Continued)

OTHER PUBLICATIONS

Kim, Bruce, "Modeling of Hindered-Settling Column Separations", Pennsylvania State University Graduate School Thesis in Mineral Processing, May 2003, 186 pgs.
(Continued)

*Primary Examiner* — Gene O Crawford
*Assistant Examiner* — Muhammad Awais
(74) *Attorney, Agent, or Firm* — Fredrikson & Byron, P.A.

(57) ABSTRACT

A method of separating a shell from a seed may involve introducing a feed stream containing shells of a fruit intermixed with seeds of the fruit into a separation column at a feed stream location. The method may also involve introducing a first volume of a separation liquid into the separation column at a first liquid addition location located below the feed stream location and a second volume of the separation liquid into the separation column at a second liquid addition location located above feed stream location. The separation liquid may flow upwardly in the separation column at a rate effective to cause the seeds of the fruit to flow upwardly with the separation liquid toward a seed outlet of the separation column while the shells of the fruit flow downwardly against the upwardly flowing separation liquid toward a shell outlet of the separation column.

20 Claims, 1 Drawing Sheet

(58) Field of Classification Search
USPC .................................. 209/132, 155, 158, 159
See application file for complete search history.

(56) References Cited

U.S. PATENT DOCUMENTS

| | | | |
|---|---|---|---|
| 4,399,027 A * | 8/1983 | Miller | ....................... B04C 5/10 |
| | | | 209/730 |
| 4,784,757 A * | 11/1988 | Nelson | .................... B03B 5/623 |
| | | | 209/159 |
| 6,076,454 A | 6/2000 | Hagon | |
| RE45,489 E | 4/2015 | Hunter et al. | |
| 2016/0000109 A1 | 1/2016 | Schnell, II et al. | |
| 2017/0164649 A1 | 6/2017 | La Cagnina | |
| 2018/0015479 A1 * | 1/2018 | Richmond | .............. B03B 13/00 |

FOREIGN PATENT DOCUMENTS

| | | | |
|---|---|---|---|
| GB | 2086207 B | | 5/1984 |
| RU | 2689004 C1 | * | 5/2019 |
| RU | 2689004 C1 | | 5/2019 |

OTHER PUBLICATIONS

International Search Report and Written Opinion of the International Application No. PCT/US2021/0123967, dated Jun. 4, 2021, 8 pg.

\* cited by examiner

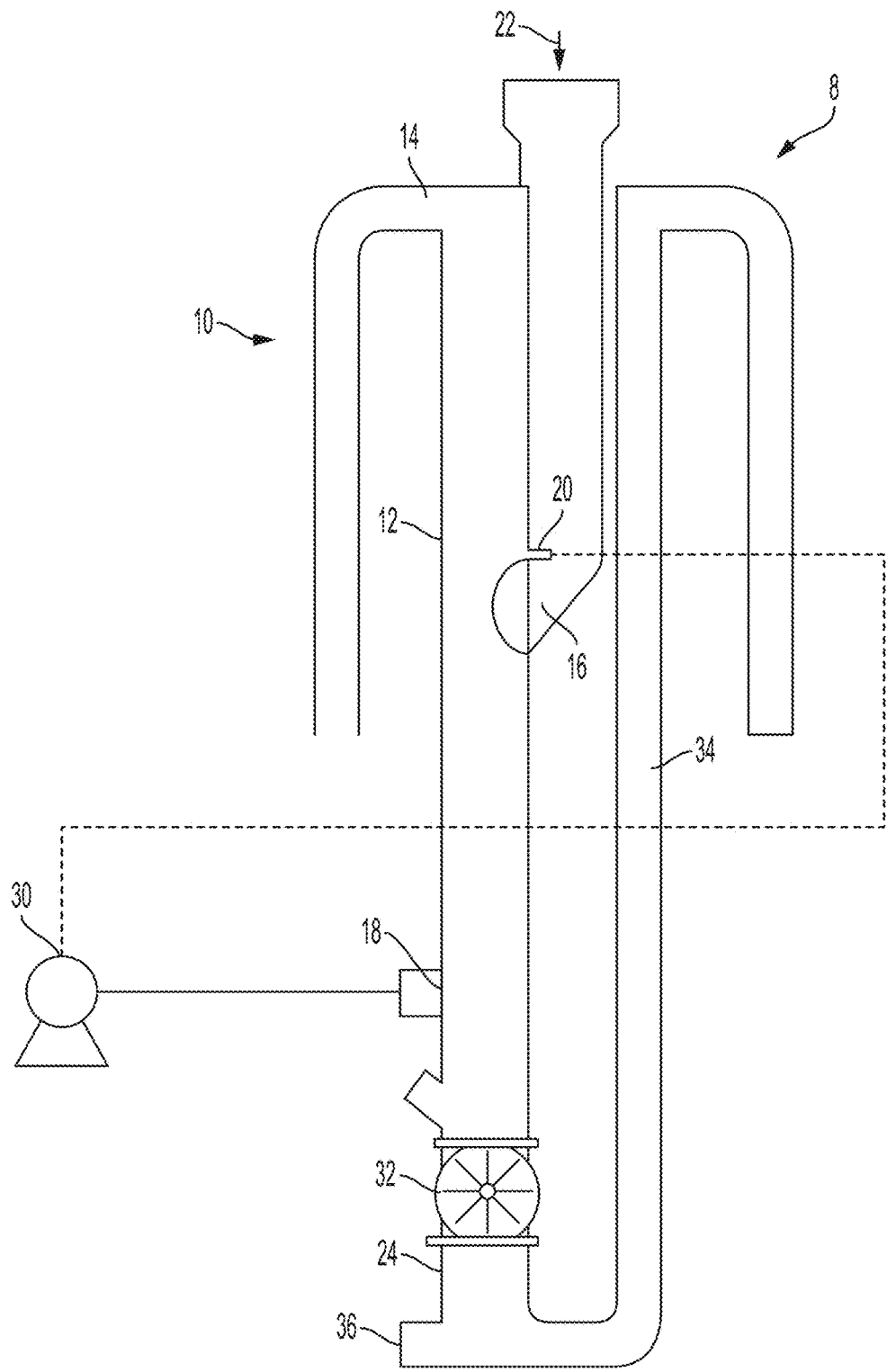

HYDRAULIC SHELL-SEED SEPARATOR

RELATED APPLICATIONS

This application is a 35 U.S.C. 371 national stage filing from International Application No. PCT/US2021/023967, filed Mar. 24, 2021, which claims priority to U.S. Provisional Patent Application No. 62/994,520, filed Mar. 25, 2020, The entire contents of both of these applications are incorporated herein by reference.

TECHNICAL FIELD

This disclosure relates to separators and, more particularly, to separators useful for separating fruit seeds from surrounding shell material.

BACKGROUND

Pneumatic separation is the process of using air to separate lighter material from heavier material in a feed stream. Pneumatic separation is based on the difference in aerodynamic properties of various constituents of the feed stream being separated. The aerodynamic property of a particle can depend upon its shape, size, density, surface area and orientation with respect to air current. In typical pneumatic separators, particles with lower terminal velocities are lifted by the air current while particles with higher terminal velocities than the air velocity fall down through the air current. The air velocity can be adjusted to change the separation characteristics of the feed stream being processed.

While comparatively simple and widely used, pneumatic separators are not suitable for all applications. For example, pneumatic separators may not provide complete or efficient separation between materials having similar aerodynamic properties. Rather, for such feed streams, the materials desirability separated from each other may exhibit similar terminal velocities against the upward flowing current of air, resulting in inefficient and/or ineffective separation.

SUMMARY

In general, this disclosure is directed to devices and techniques for separating different components in a feed stream from each other using a hydraulic fluid medium. While the described devices and techniques can be used to separate any desired two solid materials from each other, in some implementations, the devices and techniques are utilized to separate two materials having substantially similar densities from each other. A feed stream containing the two or more materials to be separated from each other can be introduced into a separation column having one or more liquid addition inlets, including at least one liquid addition inlet positioned below the feed stream entry location. A liquid separation medium, such as water, can be introduced into the separation column via the one or more liquid addition inlets. As the liquid flows upwardly in the separation column, a comparatively faster-settling material may flow downward against the liquid flow while a comparatively slower-settling material may flow upwardly with the liquid flow. The increased density of the hydraulic separation liquid as compared to a pneumatic separation fluid can provide more efficient and effective separation between the two components of similar density.

While the separation column can have a variety of different configurations and features, in some examples, the separation column includes at least two liquid addition inlets: one liquid addition inlet positioned below a feed inlet where a feed stream of the material to be processed is introduced and one liquid addition inlet positioned above the feed inlet. Configuring the separation column with multiple liquid addition inlets can be useful to drive efficient hydraulic separation of a comparatively dense material from a material having a lesser density in the column.

With some feed streams, the feed stream may not be composed of equal amounts of faster and slower settling material (heavier and lighter materials, respectively), but instead may have a disproportionate ratio of the two materials. For instance, the feed stream may have a greater amount of the faster-settling material than the slower-settling material. As the feed stream separates in the hydraulic separation column into an upward flowing stream of the lighter material and a downward flowing stream of the heavier material, the velocity of the upward flowing stream may diminish due to the disproportionate bulk of the material flowing downward. To maintain the upward velocity of the liquid (and lighter material carried therewith), additional liquid may be introduced into the second liquid addition inlet positioned above the feed inlet, providing an additional flow of liquid for efficient separation. Additionally or alternatively, the second liquid addition inlet may not be supplied with a continuous flow of liquid but may be only periodically supplied with liquid, e.g., to break or relieve plugging or other flow restrictions within the separation column.

One example application where a hydraulic separation column and/or related separation technique may be beneficially used is to separate fruit shells from fruit seeds. For example, the hydraulic separation column and/or related separation technique may be used to separate the shell of a stone fruit from the seed of the stone fruit that is contained inside the shell. The seed and shell of the stone fruit may have similar densities, making recovery of the seed from the contaminating shell material challenging. Once separated, the seed may be used for a variety of downstream applications, such as new plant cultivation, extraction of oil or other chemical components from the seed, or yet other desired applications.

In one example, a method of separating a shell from a seed is described. The method includes introducing a feed stream containing shells of a fruit intermixed with seeds of the fruit into a separation column at a feed stream location. The method also includes introducing a first volume of a separation liquid into the separation column at a first liquid addition location located below the feed stream location and introducing a second volume of the separation liquid into the separation column at a second liquid addition location located above feed stream location, which may or may not be coincident with piping delivering material to the feed stream location. The method further involves flowing the separation liquid upwardly in the separation column at a rate effective to cause the seeds of the fruit to flow upwardly with the separation liquid toward a seed outlet of the separation column while the shells of the fruit flow downwardly against the upwardly flowing separation liquid toward a shell outlet of the separation column.

In another example, a separation system for separating a shell from a seed is described. The system includes a separation column and at least one pump. The separation column includes a main separation column, a feed inlet, a first liquid addition inlet, and a second liquid addition inlet. The main separation column includes a seed outlet and shell outlet. The feed inlet intersects the main separation column at a feed stream location. The feed inlet is configured to receive a feed stream containing shells of a fruit intermixed with seeds of the fruit. The first liquid addition inlet is positioned on the main separation column below the feed stream location and is configured to receive a first volume of a separation liquid. The second liquid addition inlet is positioned above the feed stream location and is configured to receive a second volume of a separation liquid. The pump is configured to pump the first volume of the separation liquid to the first liquid addition inlet and the second volume of the separation liquid to the second liquid additional inlet, thereby causing the separation liquid to flow upwardly in the main separation column at a rate effective to cause the seeds of the fruit to flow upwardly with the separation liquid toward the seed outlet while the shells of the fruit flow downwardly against the upwardly flowing separation liquid toward the shell outlet.

The details of one or more examples are set forth in the accompanying drawings and the description below. Other features, objects, and advantages will be apparent from the description and drawings, and from the claims.

BRIEF DESCRIPTION OF DRAWINGS

FIG. 1 is an illustration of an example hydraulic separation system that may be used to separate a stream containing two or more intermixed solid materials of different densities.

DETAILED DESCRIPTION

This disclosure generally relates to devices, systems, and techniques for hydraulically separating a feed stream containing multiple co-mingled solid materials of different settling velocities using a liquid separation fluid. In general, the settling velocity of a material may be dictated by various factors such as the shape, size, and density of the material as well as the medium in which the material is settling. A heavier material (e.g., denser material) may exhibit a faster settling velocity in a given medium than a lighter material (e.g., less dense medium).

A feed stream containing two or more solid materials to be separated from each other can be supplied to a separation column having an upwardly flowing stream of liquid. Once introduced into the separation column, a comparatively faster-settling solid material (e.g., heavier material) can flow downwardly against the upwardly flowing stream of liquid. By contrast, a comparatively slower-settling solid material (e.g., lighter material) can flow upwardly with the upwardly flowing stream of liquid. The velocity of the upwardly flowing stream of liquid and/or density of the liquid used may be adjusted to control the separation efficiency between the materials intended to be separated.

For example, the separation achieved by the hydraulic separation column may be influenced by the drag force and the buoyancy force acting on the components of the feed stream. The drag force can be controlled by adjusting the velocity of the liquid in the separation column. The buoyancy force can be controlled by adjusting the density of the liquid. By controlling the characteristics of the liquid supplied to and flowing in the hydraulic separation column, the separation column can be controlled to separate the comparatively slower-settling material in a feed stream supplied to the column to flow upward with the liquid while the comparatively faster-settling material in the feed stream flows downward against the liquid.

In general, a feed composed of any two or more solid material desirably separated from each other and having different settling velocities can be separated using a hydraulic separation column according to the disclosure. In some examples, the separation column is used to separate a feed stream comprising two or more solid materials having comparatively similar densities. For example, a ratio of a density of a less dense material in the feed stream divided by a density of a denser material in the feed stream may range from 0.5 to 1, such as a value of at least 0.6, 0.7, 0.8, 0.9, or 0.95.

For example, the hydraulic separation column may be used to separate fruit shells from fruit seeds, such as separating the shells from the seeds of a stone fruit. Stone fruits and nuts are example fruits having a shell and seed that may be desirably separated from each other using a hydraulic separation column according to the disclosure. In botany, a stone fruit, which is also referred to as a drupe, is an indehiscent fruit in which an outer fleshy part (exocarp, or skin; and mesocarp, or flesh) surrounds a single shell (the pit, stone, or pyrene) of hardened endocarp with a seed (kernel) inside. These fruits usually develop from a single carpel, and mostly from flowers with superior ovaries. The stone fruit is characterized by a hard, "lignified" stone (or pit) that is derived from the ovary wall of the flower. Example drupes includes coffee, jujube, mango, olive, most palms (including acai, date, *sabal*, coconut and oil palms), pistachio, white sapote, cashew, and all members of the genus *Prunus*, including the almond, apricot, cherry, damson, nectarine, and plum. Tryma refers to nut-like drupes such as hickory nuts (*Carya*) and walnuts (*Juglans*) in the Juglandaceae family that grow within an outer husk. These fruits are typically classified as drupes or drupaceous nuts instead of botanical nuts.

Nuts are a fruit composed of an inedible hard shell and a seed, which is generally edible. Nuts typically have an ovary wall that becomes increasingly hard as it matures, where the seed remains unattached or free within the ovary wall. Many nuts come from the pistils with inferior ovaries and all are indehiscent (not opening at maturity). Example nuts include hazelnuts, chestnuts, acorns, almonds, pecans, pistachios, walnuts, and Brazil nuts.

Fruits having a seed in a shell, such as a stone fruit or a nut, may desirably be processed using a hydraulic separation column according to the disclosure. The fruit may be processed by cracking and/or dehulling the fruit to break the shell surrounding the seed. This can produce a feed stream that includes fruit seeds intermixed with fruit shell particles that need to be separated from each other to extract the seeds from the shells.

For instance, in one particular application, hydraulic separation may be performed on a plum fruit to separate plum seeds from plum shells. The plum may be processed to remove the exocarp, or skin, and the mesocarp, or flesh, of the plum. The pit of the plum (comprising the seed and shell) may then be cracked to break the hardened endocarp defining the shell, releasing the seed (kernel) inside of the shell and providing a solid mixture of plum seed and shell fragments. Plum seeds and shells have a comparatively similar density, with the seed being less dense than the shell. For example, the density of the plump seed divided by the density of the plum shell typically falls within a range from 0.8 to 0.95. Other fruit seed and shell densities may fall within this same range.

A variety of different fluids may be used as a separation liquid to separate a lighter fraction of a feed stream from a heavier fraction of the feed stream. As one example, water (which may or may not be distilled or otherwise purified) may be used as a separation liquid. The water may or may not have additives (e.g., inorganic salts) added to modify the density and buoyancy characteristic of the liquid. Other example liquids that may be used as a separation liquid include, but are not limited to, alcohols (e.g., ethanol) and organic solvents (e.g., hexane).

FIG. 1 is an illustration of an example hydraulic separation system 8 that may be used to separate a stream containing two or more intermixed solid materials into one stream composed of a slower-settling fraction and a second stream composed of a faster-settling fraction from the feed stream. System 8 includes a separation column 10 that includes a main separation column 12. Main separation column 12 has a lighter material outlet 14 (also referred to as seed outlet 14) and a heavier material outlet 24 (also referred to as shell outlet 24). Separation column 10 is also illustrated as having a feed inlet 16 intersecting the main separation column 12 at a feed stream location, a first liquid addition inlet 18, and a second liquid addition inlet 20.

In operation, a feed stream 22 that includes two or more materials of different settling velocities to be separated by separation column 10 is supplied to main column 12 via feed inlet 16. For example, a feed stream 22 that includes shells of a fruit intermixed with seeds of the fruit may be supplied to main column 12 via feed inlet 16. To deliver liquid to main column 12 for separating the different components of the feed stream from each other, separation column 10 includes first liquid addition inlet 18 positioned below the feed stream location 16. A first volume of a separation liquid may be delivered to main column 12 via first liquid addition inlet 18.

In some examples, including the example illustrated in FIG. 1, separation column 10 also includes a second liquid addition inlet 20 positioned above feed stream location 16. When so configured, a second volume of separation liquid may be delivered to main column 12 via second liquid addition inlet 20. Configuring separation column 10 with at least one liquid addition inlet below feed stream location 16 and at least one liquid addition inlet above the feed stream location may be useful to provide different liquid volumes and/or velocities at different positions within main column 12.

In operation, the amount and/or velocity of liquid supplied to main column 12 may be effective to cause the lighter material (e.g., the seeds of a fruit) to flow upwardly with the separation liquid toward seed outlet 14 while the heavier material (e.g., the shells of the fruit) flow downwardly against the upwardly flowing separation liquid toward shell outlet 24. The entire amount of separation liquid delivered to main column 12 may be supplied via first liquid addition inlet 18, supplied via second liquid addition inlet 20, supplied via a combination of first and second liquid addition inlets 18, 20, and/or supplied alone or in combination with one or more other fluid inlets.

In some examples, the volume of liquid supplied to main column 12 to provide an upward flowing stream is divided between first liquid addition inlet 18 and second liquid addition inlet 20. Depending on the type of feed stream 22 being processed by separation column 10, the lighter fraction of material in the feed stream may provide a lesser weight and/or volume of the overall feed stream 22 than the heavier fraction of material in the feed stream. For example, the lighter fraction of material may range from 10% to 50% of the weight and/or volume of feed stream 22 (the combination of the weight and/or volume of the lighter fraction and the heavier fraction), such as from 20% to 30%. By contrast, the heavier fraction of material may range from 50% to 90% of the weight and/or volume of the feed stream (the combination of the weight and/or volume of the lighter fraction and the heavier fraction), such as from 70% to 80%. As a result, a greater amount of material may flow down the main column 12 toward shell outlet 24 than up the column and out seed outlet 14.

To maintain the upward velocity of the liquid (and lighter material carried therewith), additional liquid may be introduced into second liquid addition inlet 20 positioned above the feed inlet 16. This can provide additional force and liquid volume for conveying the lesser amount of the lighter fraction of feed stream 22 toward seed outlet 14.

When used, a greater volume of the separating liquid supplied to main column 12 may be supplied to first liquid addition inlet 18 than second liquid addition inlet 20. The volume of separating liquid supplied to first liquid addition inlet 18 can be characterized as a first volume of separation liquid while the volume of separating liquid supplied to second liquid addition inlet 20 can be characterized as a second volume of separation liquid. In some examples, a ratio of the first volume of the separation liquid supplied divided by a combined volume of the first volume of the separation liquid and the second volume of the separation fluid is great than 0.5, such as greater than 0.7, greater than 0.9, or greater than 0.98.

Separation liquid can be supplied to both first liquid addition inlet 18 and second liquid addition inlet 20 simultaneously during operation of separating column 10 (e.g., to provide a combined flow of the liquid exiting through seed outlet 14). Alternatively, separating liquid may be delivered to second liquid addition inlet 20 intermittently while liquid is continuously supplied to first liquid addition inlet 18 or separating liquid may be delivered to second liquid addition inlet 20 while liquid is not supplied to first liquid addition inlet 18. In these applications, the liquid supplied to second liquid addition inlet 20 may not be intended to provide additional uplift force to the lighter fraction of material separated from feed stream 22. Instead, the liquid may be supplied to second liquid addition inlet 20 for other purposes. For example, liquid may be periodically supplied to second liquid addition inlet 20 to breakup plugging or other flow restrictions that may periodically build up inside main column 12.

To supply separation liquid to main column 12 via one or more inlets, separation system 8 may include at least one pump 30. Pump 30 can be in fluid communication with a source of liquid to be introduced into separation column 10. Pump 30 can receive and pressurize the liquid, discharging the liquid for delivery to first liquid addition inlet 18, second liquid addition inlet 20, and/or other liquid addition inlets. For example, pump 30 can pump a first volume of the separation liquid to first liquid addition inlet 18 and further pump a second volume of the separation liquid to second liquid additional inlet 20.

As mentioned, the upward flow (e.g., in the vertical direction against the force of gravity) of separation liquid inside of main column 12 may be at a rate effective to cause the lighter fraction (e.g., seeds of the fruit) to flow upwardly with the separation liquid toward a seed outlet 14 while the heavier fraction (e.g., shells of the fruit) flows downwardly against the upwardly flowing separation liquid and finally toward a shell outlet 24. The velocity of liquid inside of main column 12 needed to achieve this separation can vary based on factors such as the density of the different fractions of feed stream 22 being separated from each other and the density of the separating liquid. In some examples, such as when separating fruit seeds from shells (e.g., plum seeds from shells), the velocity of the liquid inside of main column 12 may range from 0.03 meters per second (m/s) to 0.5 m/s, such as from 0.1 m/s to 0.3 m/s. The velocity of the separating liquid may be substantially constant (e.g., plus or minus 10%) across the vertical length of main column 12 or may vary at different locations along the length of the column. For example, the velocity of separation liquid within main column 12 may be less below first liquid addition inlet 18 than above the liquid addition inlet and/or may vary with the addition of a second volume of liquid at second liquid addition inlet 20.

When configured with a second liquid addition location 20, the second liquid addition location may be positioned at any suitable location above feed inlet 16. For instance, in different configurations, second liquid addition location 20 may be located on a portion of piping conveying feed stream 22 to feed inlet 16 or on a portion of main column 12 above feed inlet. For example, in the illustrated configuration, feed inlet 16 is illustrated as including a segment of piping extending vertically parallel to main column 12. As a result, feed inlet 16 defines a region above where the feed stream 22 enters main column 12. When so configured, second liquid addition inlet 20 may be positioned on the segment of feed inlet above where the feed stream enters main column 12 (e.g., such that liquid enters second liquid addition inlet 20 and enters main column 12 via feed inlet 16) or may be a nozzle or other opening formed directly on the main column above where the feed stream enters the main column.

Although second liquid addition inlet 20 can be located at various vertical elevations above where feed stream 22 enters main column 12, in some implementations, the second liquid addition inlet is positioned comparatively close to the entry location. Positioning second liquid addition inlet 20 comparatively close to the location where feed stream 22 enters main column 12 can be useful so that liquid entering the column through the inlet can break up solid/feed material plugging that may occur at the entry location and/or provide an upward force to help efficiently separate the lighter feed fraction from the heavier feed fraction. In some examples, the second liquid addition location 20 is located within a distance of where feed stream 22 enters main column 12 (referred to as a feed stream location) that is less than or equal to the diameter of feed inlet 16.

Feed inlet 14 and seed outlet 14 can be arranged a number of different ways relative to main column 12. In the illustrated example, feed inlet 16 intersects main column 12 around a midline of the column and includes a piping extending vertically upwards parallel to the main column. The piping defining feed inlet 16 may extend vertically above the main separation column, e.g., to allow the liquid level in the main column to extend the a top of the column without discharging out of the top of the feed inlet. In FIG. 1, seed outlet 14 extends off main column 12 above the feed stream location (e.g., where feed stream 22 enters the column via feed inlet 16) but below the top/entry location of the feed inlet. This can allow the separation liquid and seeds carried therewith to flow out of seed outlet 14 without discharging out of the top of the feed inlet.

To control the downward flow of separation liquid and the discharge of the faster-settling fraction of feed stream 22 out of the separation column, the separation column may include a valve 32 positioned below first liquid addition inlet 18. Valve 32 may be implemented using a rotary valve and/or sliding gate valve. Valve 32 can regulate a flow of the heavier fraction of separated material (e.g., shells) from the main column 12 to the shell outlet 24.

To help balance hydraulic pressure and flow within separation column 10, the column may also include a shell discharge pipe 34 in fluid communication with shell outlet 24. Shell discharge pipe 34 may extend vertically upwardly from shell outlet 24 to a height substantially co-linear with the seed outlet. This can allow the separated shells and any entrained separation liquid carried therewith to flow out of shell discharge pipe 34 at a vertical height substantially colinear with seed outlet 14. As a result, elevation of the liquid discharging with the seeds via seed outlet 14 and with the shells via shell discharge pipe 34 may be substantially co-linear, providing a balanced liquid level within separation column 10.

As briefly noted, separation column 10 may include two or more liquid addition inlets to introduce separation liquid at different locations to the column. In the illustrated example, separation column 10 is illustrated as further including a third liquid addition inlet 36 located below valve 32 and intersecting shell outlet 24. When so configured, a volume of separation liquid (e.g., a third volume of the separation liquid introduced via one or more pumps 30) can be supplied to shell discharge pipe 34 via the third liquid addition location 36. The volume of liquid added can provide a motive force conveying the separated shell through the length of shell discharge pipe 34 before discharging out of the pipe at a discharge location.

A feed steam 22 introduced into separation column 10 can be efficiently and effectively separated into a slower-settling fraction discharging through seed outlet 14 and a faster-settling fraction discharging through shell outlet 24 (and, subsequently, shell discharge pipe 34). The slower and faster-settling fractions may then be separated from the surrounding liquid conveying the materials through the separation column and/or discharge piping. This liquid can then be recycled for reuse in system 8. The resulting separated fractions (e.g., seeds and shells) can be further processed as desired. For example, the seeds may be thermally dried to remove residual liquid (e.g., water) and/or pressed and/or extracted with a solvent to remove oil or other extractable components for resale or further processing.

Various examples have been described. These and other examples are within the scope of the following claims.

The invention claimed is:

1. A method of separating a shell from a seed, the method comprising:
    introducing a feed stream containing shells of a fruit intermixed with seeds of the fruit into a separation column, wherein introducing the feed stream into the separation column comprises introducing the feed stream into the separation column at a feed stream location;
    introducing a first volume of a separation liquid into the separation column at a first liquid addition location located below the feed stream location;
    introducing a second volume of the separation liquid into the separation column at a second liquid addition location located above feed stream location;
    flowing the separation liquid upwardly in the separation column at a rate effective to cause the seeds of the fruit to flow upwardly with the separation liquid toward a seed outlet of the separation column while the shells of the fruit flow downwardly against the upwardly flowing separation liquid toward a shell outlet of the separation column.

2. The method of claim 1, wherein the separation liquid comprises water.

3. The method of claim 1, wherein the fruit is at least one of a drupe and a nut.

4. The method of claim 1, wherein the fruit is a plum.

5. The method of claim 1, wherein the shells of the fruit have a shell density, and the seeds of the fruit have a seed density, and a ratio of the seed density divided by the shell density is at least 0.7.

6. The method of claim 5, wherein the ratio ranges from 0.8 to 0.95.

7. The method of claim 1, wherein the separation column comprises a feed inlet intersecting a main separation column at the feed stream location, and the second liquid addition location is located on the main separation column above the feed stream location or on the feed inlet above the feed stream location.

8. The method of claim 7, wherein the feed inlet has a diameter, and the second liquid addition location is located within a distance of the feed stream location less than or equal to the diameter of the feed inlet.

9. The method of claim 7, wherein:
the feed inlet extends vertically above the main separation column, and
the seed outlet extends off the main separation column above the feed stream location and below the feed inlet.

10. The method of claim 7, wherein the separation column comprises a valve positioned below the first liquid addition location, the valve regulating a flow of shells from the main separation column to the shell outlet.

11. The method of claim 1, wherein the separation column further comprises a shell discharge pipe extending vertically upwardly from the shell outlet of the separation column to a height substantially co-linear with the seed outlet.

12. The method of claim 10, further comprising introducing a third volume of the separation liquid into the shell discharge pipe at a third liquid addition location located below the valve.

13. The method of claim 1, wherein a ratio of the first volume of the separation liquid divided by a combined volume of the first volume of the separation liquid and the second volume of the separation fluid is great than 0.7.

14. The method of claim 1, wherein that rate ranges from 0.03 meters per second to 0.5 meters per second.

15. A separation system for separating a shell from a seed, the separation system comprising:
a separation column comprising:
a main separation column having a seed outlet and shell outlet;
a feed inlet intersecting the main separation column at a feed stream location, the feed inlet being configured to receive a feed stream containing shells of a fruit intermixed with seeds of the fruit;
a first liquid addition inlet positioned on the main separation column below the feed stream location, the first liquid addition inlet being configured to receive a first volume of a separation liquid; and
a second liquid addition inlet positioned above the feed stream location, the second liquid addition inlet being configured to receive a second volume of a separation liquid;
at least one pump configured to pump the first volume of the separation liquid to the first liquid addition inlet and the second volume of the separation liquid to the second liquid additional inlet, thereby causing the separation liquid to flow upwardly in the main separation column at a rate effective to cause the seeds of the fruit to flow upwardly with the separation liquid toward the seed outlet while the shells of the fruit flow downwardly against the upwardly flowing separation liquid toward the shell outlet.

16. The separation system of claim 15, wherein the second liquid addition inlet is located on the main separation column above the feed stream location or on the feed inlet above the feed stream location.

17. The separation system of claim 15, wherein the feed inlet has a diameter, and the second liquid addition inlet is located within a distance of the feed stream location less than or equal to the diameter of the feed inlet.

18. The separation system of claim 15, wherein:
the feed inlet extends vertically above the main separation column, and
the seed outlet extends off the main separation column above the feed stream location and below the feed inlet.

19. The separation system of claim 15, wherein the separation column further comprises a valve positioned below the first liquid addition inlet, the valve regulating a flow of shells from the main separation column to the shell outlet.

20. The separation system of claim 15, wherein the separation column further comprises a shell discharge pipe extending vertically upwardly from the shell outlet of the separation column to a height substantially co-linear with the seed outlet.

\* \* \* \* \*